A. RIGBY.
Plow.

No. 159,967.  Patented Feb. 16, 1875.

Witnesses:
P. C. Dieterich
W. C. McArthur

Inventor:
A. Rigby
per: T. H. Alexander
Attorney.

UNITED STATES PATENT OFFICE.

ARTEMAS RIGBY, OF UPPER STILLWATER, MAINE.

IMPROVEMENT IN PLOWS.

Specification forming part of Letters Patent No. 159,967, dated February 16, 1875; application filed December 21, 1874.

*To all whom it may concern:*

Be it known that I, A. RIGBY, of Upper Stillwater, in the county of Penobscot and State of Maine, have invented certain new and useful Improvements in Plows; and I do hereby declare that the following is a full, clear, and exact description thereof, reference being had to the accompanying drawings, and to the letters of reference marked thereon, which form part of this specification.

The nature of my invention consists in the construction and arrangement of a subsoil-plow, as will be hereinafter more fully set forth.

In order to enable others skilled in the art to which my invention appertains to make and use the same, I will now proceed to describe its construction and operation, referring to the annexed drawing, in which—

Figure 1:
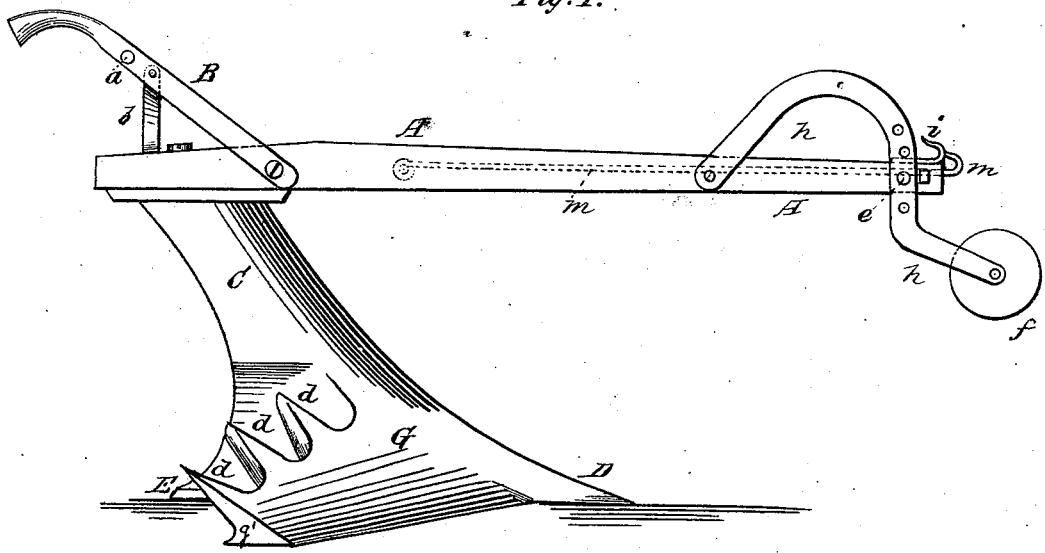
Figure 2:
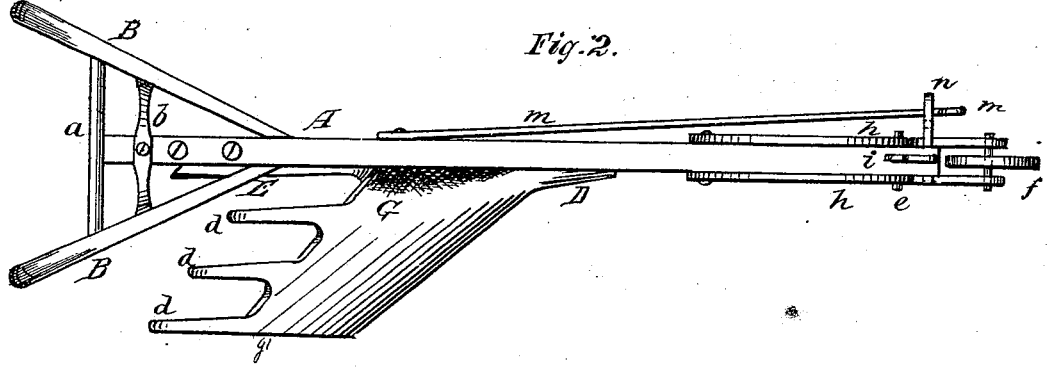

Figure 1 is a side elevation, and Fig. 2 is a plan view, of my invention.

A represents the plow-beam, of any suitable dimensions, on each side of which, a suitable distance from the rear end, is secured a short handle, B, and the two handles are connected together by a round, $a$, and to the beam by an angular brace, $b$. C is the shank of the plow, secured by bolts to the under side of the plow-beam, at or near the rear end. The shank C is provided with, or extended to form, the land-side E and point D, with the share G extending toward the right. The outer end of the share is made parallel with the land-side, and from the upper rear edge of the share project cutters $d\ d$, to pulverize the earth. The front end of the plow-beam A is supported upon the ground by a small wheel, $f$, pivoted between the front ends of two curved bars, $h\ h$, the rear ends of which are pivoted to the plow-beam, and then curved upward, forward, and downward, passing one on each side of the beam, and adjusted at any height desired by a pin, $e$, thereby regulating the height of the wheel $f$; and hence, also, the depth at which the plow is to work. On top of the beam A, at the front end, is a hook, $i$, for the attachment of the team when the plow is making the furrow and subsoiling at the same time. When the plow is working in a furrow already made, to subsoil, the team is attached to the front end of a draft-rod, $m$, which is fastened to the left side of the beam, near the handles, and extends forward through a perforated ear or bar, $n$, projecting from the side of the beam, near the front end.

This subsoil-plow cuts the whole width of the furrow, pulverizes all the ground any depth, and is adapted to all kinds of land that needs to be subsoiled. It does not mix any of the subsoil with the top loam. It can be worked with one or four horses, is held easily with one hand, and is simple, strong, and durable.

Having thus fully described my invention, what I claim as new, and desire to secure by Letters Patent, is—

The subsoil-plow having the standard C, land-side E, and share G, the share having cutters $d\ d$, with a shoe, $g'$, upon its outer side, parallel with and upon the same plane as the land-side, substantially as and for the purpose set forth.

In testimony that I claim the foregoing as my own I affix my signature in presence of two witnesses.

ARTEMAS RIGBY.

Witnesses:
G. B. MICHAEL,
W. C. WATERHOUSE.